(12) United States Patent
Kitoh et al.

(10) Patent No.: US 6,710,484 B2
(45) Date of Patent: Mar. 23, 2004

(54) MOTOR HAVING ELECTRONIC CONTROL UNIT AND METHOD FOR MANUFACTURING THE SAME

(75) Inventors: Kazuto Kitoh, Toyohashi (JP); Takayoshi Aoyama, Toyohashi (JP); Yoshiaki Saitou, Kosai (JP)

(73) Assignee: Asmo Co., Ltd., Shizuoka (JP)

( * ) Notice: Subject to any disclaimer, the term of this patent is extended or adjusted under 35 U.S.C. 154(b) by 107 days.

(21) Appl. No.: 10/144,746

(22) Filed: May 15, 2002

(65) Prior Publication Data

US 2004/0012283 A1 Jan. 22, 2004

(30) Foreign Application Priority Data

May 28, 2001 (JP) .......................... 2001-158590
Sep. 18, 2001 (JP) .......................... 2001-283845

(51) Int. Cl.$^7$ ................................ H02K 5/00
(52) U.S. Cl. .................... 310/83; 310/89; 310/91; 29/596
(58) Field of Search ..................... 310/83, 89, 91, 310/99; 29/596, 597, 598

(56) References Cited

U.S. PATENT DOCUMENTS

| | | | | | |
|---|---|---|---|---|---|
| 5,027,024 A | * | 6/1991 | Slayton | .................. | 310/90 |
| 5,836,219 A | * | 11/1998 | Klingler et al. | .......... | 74/606 R |
| 6,111,378 A | * | 8/2000 | LeMay et al. | ............. | 318/443 |
| 6,491,131 B1 | * | 12/2002 | Appleyard | ................. | 180/444 |

\* cited by examiner

*Primary Examiner*—Tran Nguyen
*Assistant Examiner*—David W. Scheuermann
(74) *Attorney, Agent, or Firm*—Posz & Bethards, PLC

(57) ABSTRACT

An electronic control unit is received in an electronic control unit receiving portion of a gear housing of a motor, and a support plate is press fitted into a couple of plate receiving holes, which penetrate through opposite walls, respectively, of the gear housing in a direction perpendicular to an axial direction of the motor at an open end of the gear housing. A yoke housing of a motor unit is secured to the support plate with screws while a brush holder is clamped between a flange of the yoke housing and the support plate.

14 Claims, 7 Drawing Sheets

MOTOR HAVING ELECTRONIC CONTROL UNIT AND METHOD FOR MANUFACTURING THE SAME

CROSS REFERENCE TO RELATED APPLICATION

This application is based on and incorporates herein by reference Japanese Patent Application No. 2001-158590 filed on May 28, 2001 and Japanese Patent Application No. 2001-283845 filed on Sep. 18, 2001.

BACKGROUND OF THE INVENTION

1. Field of the Invention

The present invention relates to a motor and a method for manufacturing the same. More specifically, the present invention relates to a motor, which has a speed reducing mechanism and an electronic control unit (ECU) both received in a gear housing, and also to a method for manufacturing the same.

2. Description of Related Art

A motor, which has a motor unit and a speed reducing unit for reducing a rotational speed of the motor unit, is generally used as a drive source for driving a vehicle sunroof system. The motor unit includes a yoke housing, which receives an armature, magnets and the like. The speed reducing unit includes a resin gear housing, which receives a speed reducing mechanism. An open end of the yoke housing opposes and engages an open end of the gear housing, and the yoke housing and the gear housing are securely connected together with screws. Some such motors also have an electronic control unit (ECU) for controlling rotation of the motor unit. That is, an ECU receiving portion is formed in the gear housing to receive the ECU. The ECU is inserted into the gear housing through an open end of the ECU receiving portion or an open end of the gear housing.

The ECU and the yoke housing (motor unit) are sequentially installed to the gear housing in the same direction. Specifically, the ECU is first installed in the gear housing, and then the motor unit is securely connected to the gear housing with screws. Thus, if a protrusion(s) having a bearing surface, which supports and threadably engages with the corresponding screw, extends inwardly from a corresponding inner wall surface of the gear housing near the open end of the gear housing, a size of the open end of the ECU receiving portion is reduced by this protrusion. Thus, the installing operation of the ECU into the ECU receiving portion of the gear housing becomes more difficult, and positions of components in the ECU are adversely limited by the reduced size of the open end of the ECU receiving portion. Alternatively, if the protrusion(s) having the bearing surface extends outwardly from a corresponding outer wall surface of the gear housing near the open end of the gear housing, the undesirable protrusion(s) is formed outside of the gear housing. Thus, an installation position of the motor relative to the sunroof system is adversely limited by the undesirable protrusion. That is, the motor having the undesirable protrusion(s) requires an extra space for accommodating the protrusion(s).

SUMMARY OF THE INVENTION

The present invention addresses the above disadvantages. Thus, it is an objective of the present invention to provide a motor having an electronic control unit received in a housing, which has a wider open end for insertion of the electronic control unit into the housing. It is another objective of the present invention to provide a method for manufacturing such a motor.

To achieve the objectives of the present invention, there is provided a motor including a motor unit and a speed reducing unit connected to the motor unit. The motor unit includes and rotates a rotatable shaft. The speed reducing unit reduces a rotational speed of the rotatable shaft. Furthermore, the speed reducing unit includes a gear housing and a support plate. The gear housing has an open end and receives an electronic control unit that controls rotation of the rotatable shaft. The support plate is detachably supported in the gear housing in such a manner that the support plate extends across the open end of the gear housing in a direction perpendicular to an axial direction of the motor. The motor unit is secured to the support plate with at least one fastening member to securely connect the motor unit to the gear housing.

To achieve the objectives of the present invention, there is also provided a method for manufacturing a motor including a motor unit and a speed reducing unit connected to the motor unit. The motor unit includes and rotates a rotatable shaft. The speed reducing unit reduces a rotational speed of the rotatable shaft and includes a gear housing, which has an open end and receives an electronic control unit that controls rotation of the rotatable shaft. The method includes steps of inserting the electronic control unit within the gear housing, inserting a support plate into a couple of plate receiving holes, which penetrate through opposite walls, respectively, of the gear housing in a direction perpendicular to an axial direction of the motor at the open end of the gear housing, so that the support plate extends across the open end of the gear housing in the direction perpendicular to the axial direction of the motor, and securing the motor unit to the support plate with at least one fastening member to securely connect the motor unit to the gear housing.

To achieve the objectives of the present invention, there is also provided a method for manufacturing a motor including a motor unit and a speed reducing unit connected to the motor unit. The motor unit includes and rotates a rotatable shaft. The speed reducing unit reduces a rotational speed of the rotatable shaft and includes a gear housing, which has an open end and receives an electronic control unit that controls rotation of the rotatable shaft. The method includes steps of physically and electrically connecting the electronic control unit to the motor unit, inserting the electronic control unit within the gear housing, so that the motor unit abuts against the gear housing, inserting a support plate into a couple of plate receiving holes, which penetrate through opposite walls, respectively, of the gear housing in a direction perpendicular to an axial direction of the motor at the open end of the gear housing, so that the support plate extends across the open end of the gear housing in the direction perpendicular to the axial direction of the motor, and securing the motor unit to the support plate with at least one fastening member to securely connect the motor unit to the gear housing.

BRIEF DESCRIPTION OF THE DRAWINGS

The invention, together with additional objectives, features and advantages thereof, will be best understood from the following description, the appended claims and the accompanying drawings in which:

DETAILED DESCRIPTION OF THE INVENTION

First Embodiment

A first embodiment of the present invention will be described with reference to the accompanying drawings.

Figure 1:
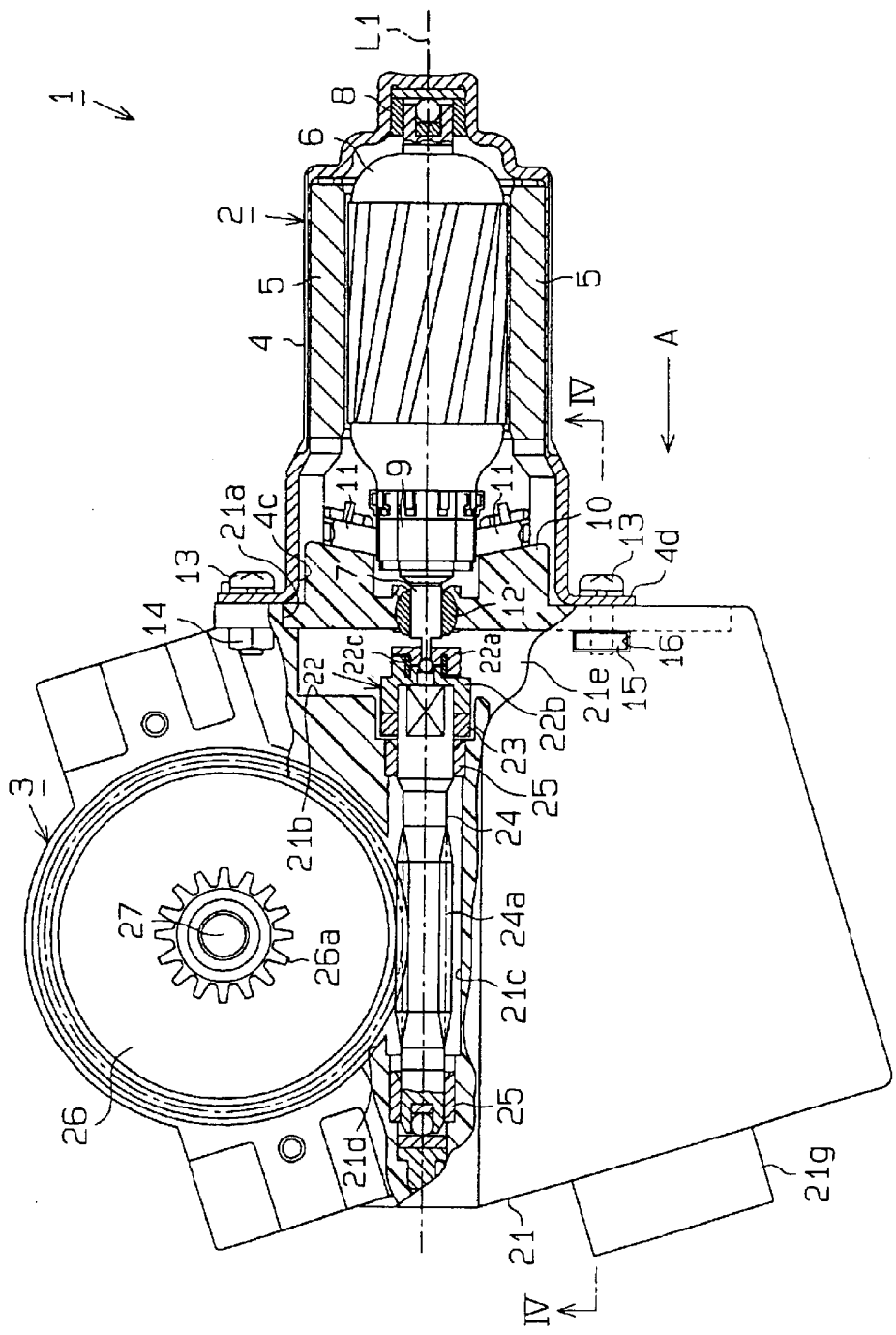
FIG. 1 is a partially fragmented plan view of a motor according to a first embodiment of the present invention.

FIG. 1 shows a motor 1 having a speed reducing mechanism.

The motor 1 can be used, for example, as a drive source for driving a vehicle sunroof system. The motor 1 includes a motor unit 2 and a speed reducing unit 3 connected together.

Figure 3:
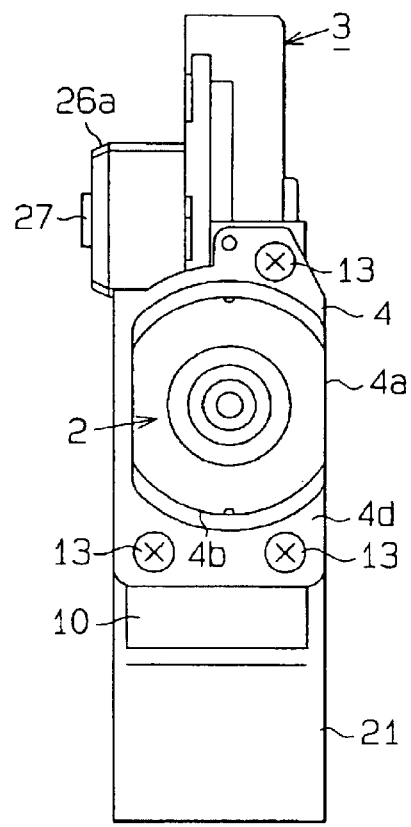
FIG. 3 is a front view of the motor according to the first embodiment in the direction of arrow A, in FIG. 1.

As shown in FIG. 3, the motor unit 2 includes a flat cylindrical yoke housing 4. The yoke housing 4 includes a couple of parallel flat walls 4a and a couple of arcuate walls 4b, which connect the flat walls 4a together. A planar direction of a plane of each flat wall 4a will be referred to as a flat direction of the motor 1. The yoke housing 4 is made of a magnetic material. A plurality of magnets 5 are secured to an inner wall surface of the yoke housing 4. Furthermore, an armature 6 is rotatably received radially inward of the magnets 5 in the yoke housing 4. The armature 6 includes a rotatable shaft 7. A base end of the rotatable shaft 7 is rotatably supported by a bearing 8 provided at a base of the yoke housing 4. A commutator 9 is secured to a distal end of the rotatable shaft 7.

A brush holder 10 made of a resin material is inserted in an open end 4c of the yoke housing 4. The brush holder 10 supports a couple of brushes 11, which are in sliding contact with the commutator 9. The brush holder 10 also supports a bearing 12 at its center. The bearing 12 rotatably supports a distal end side of the rotatable shaft 7.

The brush holder 10 extends in the planar direction (flat direction) of the flat wall 4a of the yoke housing 4. The brush holder 10 is held between the open end 4c of the yoke housing 4 and an open end 21a of a gear housing 21, which will be described later, and closes these open ends 4c, 21a. In general, the brush holder 10 is first fitted into the open end 4c of the yoke housing 4 and is then fitted into the open end 21a of the gear housing 21 along with the yoke housing 4.

In the present embodiment, the yoke housing 4 is secured to the gear housing 21 with screws (fastening members) 13 at three points. More specifically, the yoke housing 4 is first secured to the gear housing 21 at one point (left side in FIG. 1) with one screw 13. The screw 13 is inserted through a through hole (not shown) of the yoke housing 4 and a through hole (not shown) of the gear housing 21 and is threadably securely engaged with a nut 14. Then, the yoke housing 4 is secured to the gear housing 21 at other two points (right side in FIG. 1) with two screws 13. The two screws 13 extend through the yoke housing 4 and the brush holder 10 and are secured in the gear housing 21. Here, the brush holder 10 is clamped between a rectangular support plate 15 and a yoke flange 4d of the yoke housing 4 and is secured to the support plate 15 and the flange 4d with the two screws 13. The support plate 15 is made of a metal material and is received in the gear housing 21.

A way of securing the yoke housing 4 to the gear housing 21 at the two securing points on the support plate 15 will be described in greater details. With reference to FIG. 1, a couple of plate receiving holes 16 penetrate through opposite lateral walls, respectively, of the gear housing 21 in a direction perpendicular to a direction of an axis L1 (axial direction) of the motor 1 near the open end 21a of the gear housing 21. The plate receiving holes 16 receive opposite ends, respectively, of the support plate 15. Positions of the plate receiving holes 16 are determined in consideration of the axial thickness of the brush holder 10, so that the plate receiving holes 16 are positioned to allow close contact of the support plate 15 with the brush holder 10. The rectangular support plate 15 extends across the open end 21a of the gear housing 21 and is received in the plate receiving holes 16 of the gear housing 21. A size of each plate receiving hole 16 is slightly smaller than a size of a corresponding end surface of the support plate 15, which faces in the direction perpendicular to the direction of the axis L1 of the motor 1 and is received in the plate receiving hole 16. That is, the support plate 15 is press fitted into the plate receiving holes 16, so that the support plate 15 is temporarily secured to the gear housing 21.

Figure 2:
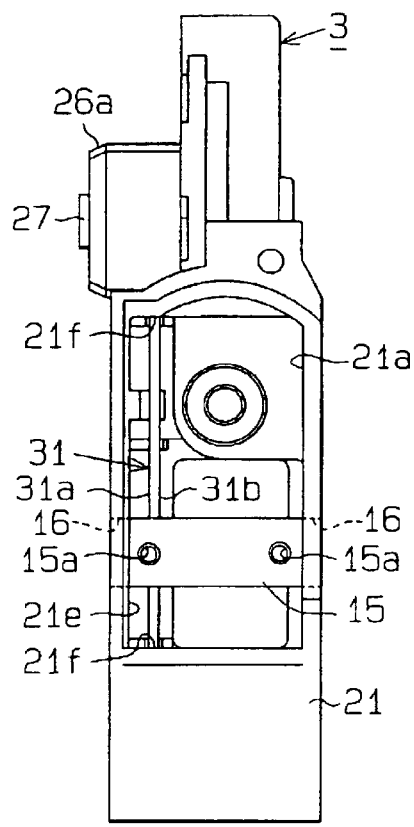
FIG. 2 is an end view of an unassembled gear housing of a speed reducing unit of the motor according to the first embodiment in a direction of arrow A in FIG. 1.

With reference to FIG. 2, the support plate 15 is formed such that when the support plate 15 is received in the plate receiving holes 16 of the gear housing 21, each end surface of the support plate 15 is substantially flushed with an outer surface of the corresponding lateral wall of the gear housing 21. Two threaded holes 15a penetrate through the support plate 15 in the direction of the axis L1 of the motor 1 and are threadably engaged with the screws 13, respectively. These threaded holes 15a are positioned such that when the support plate 15 is inserted into the plate receiving holes 16, the threaded holes 15a are located inward of the inner wall surfaces of the gear housing 21. That is, the threaded holes 15a are positioned such that the screws 13 threadably engaged with the threaded holes 15a, respectively, do not physically interfere with the inner wall surfaces of the gear housing 21.

Figure 4:
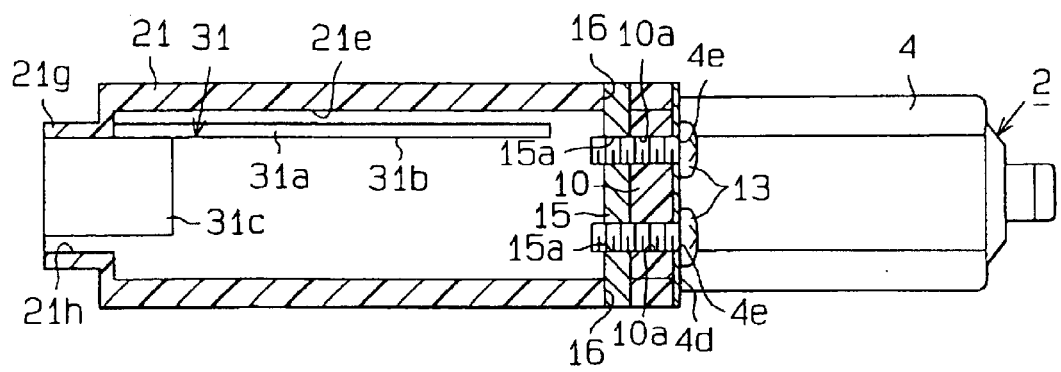
FIG. 4 is a cross sectional view of the motor of the first embodiment taken along line IV—IV in FIG. 1.
Figure 5:
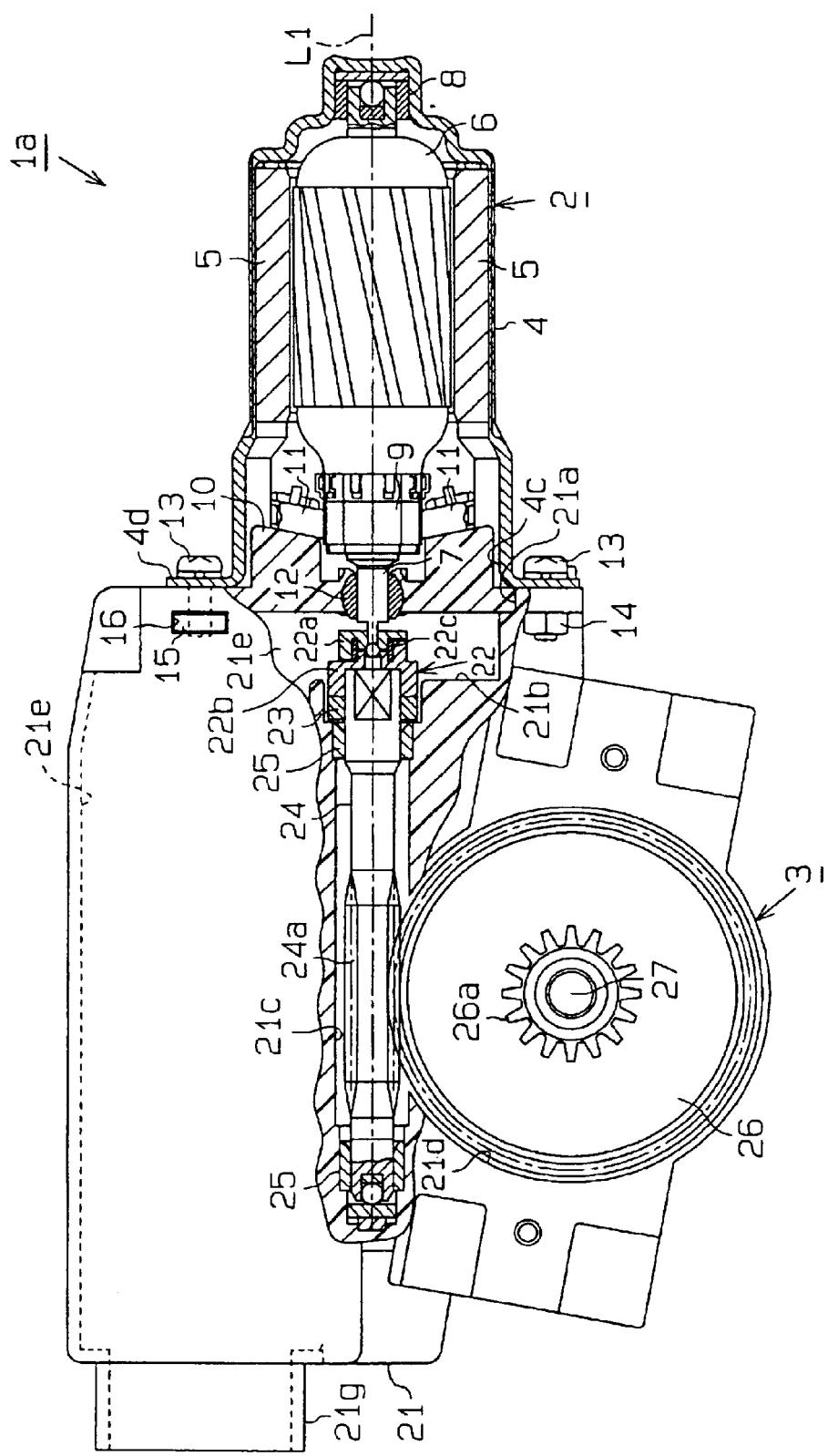
FIG. 5 is a partially fragmented plan view of a motor according to a second embodiment of the present invention.
Figure 6:
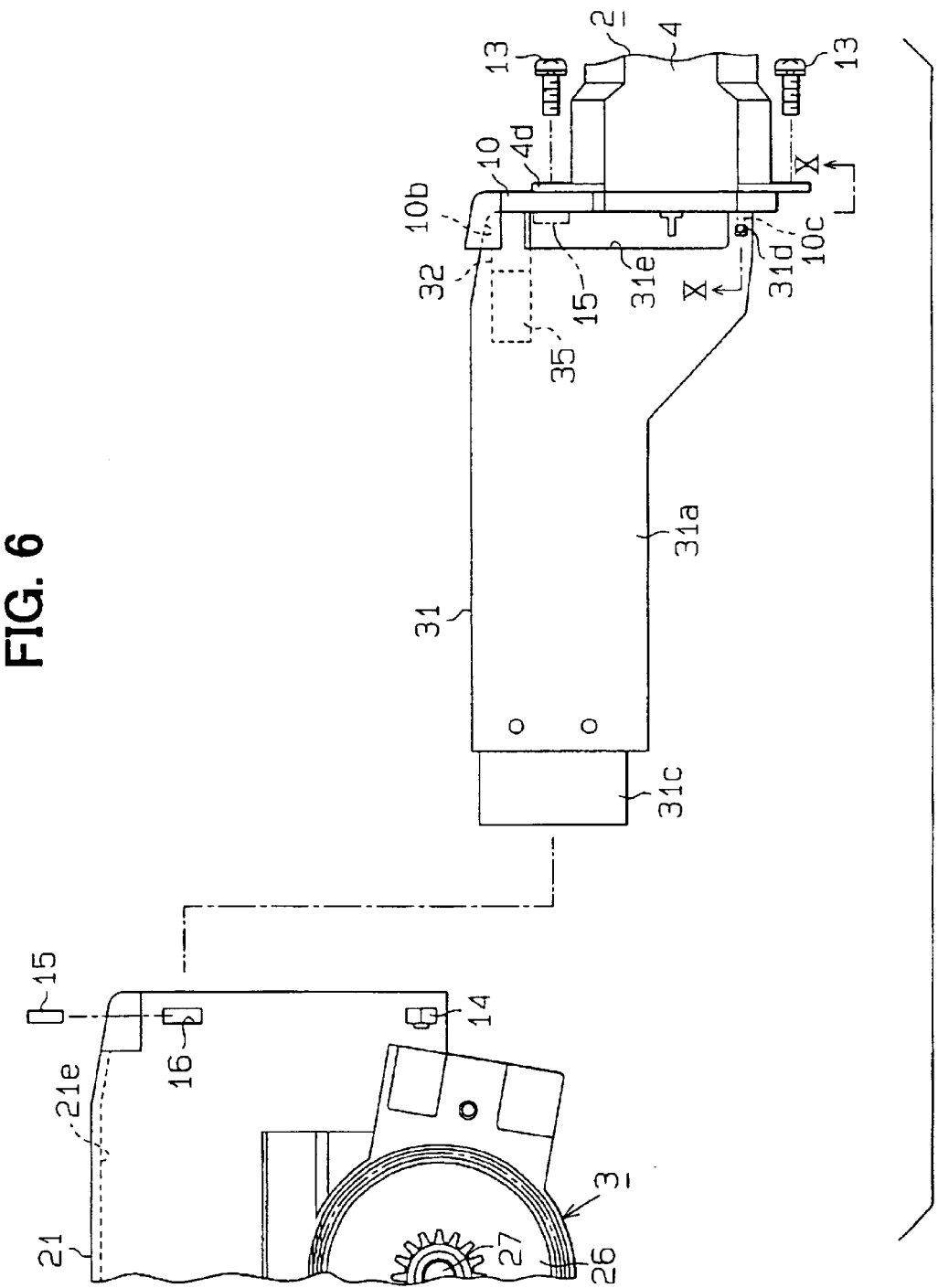
FIG. 6 is a partial schematic view of a motor unit and the speed reducing unit of the motor according to the second embodiment, showing a disconnected state of the motor unit and the speed reducing unit.
Figure 7:
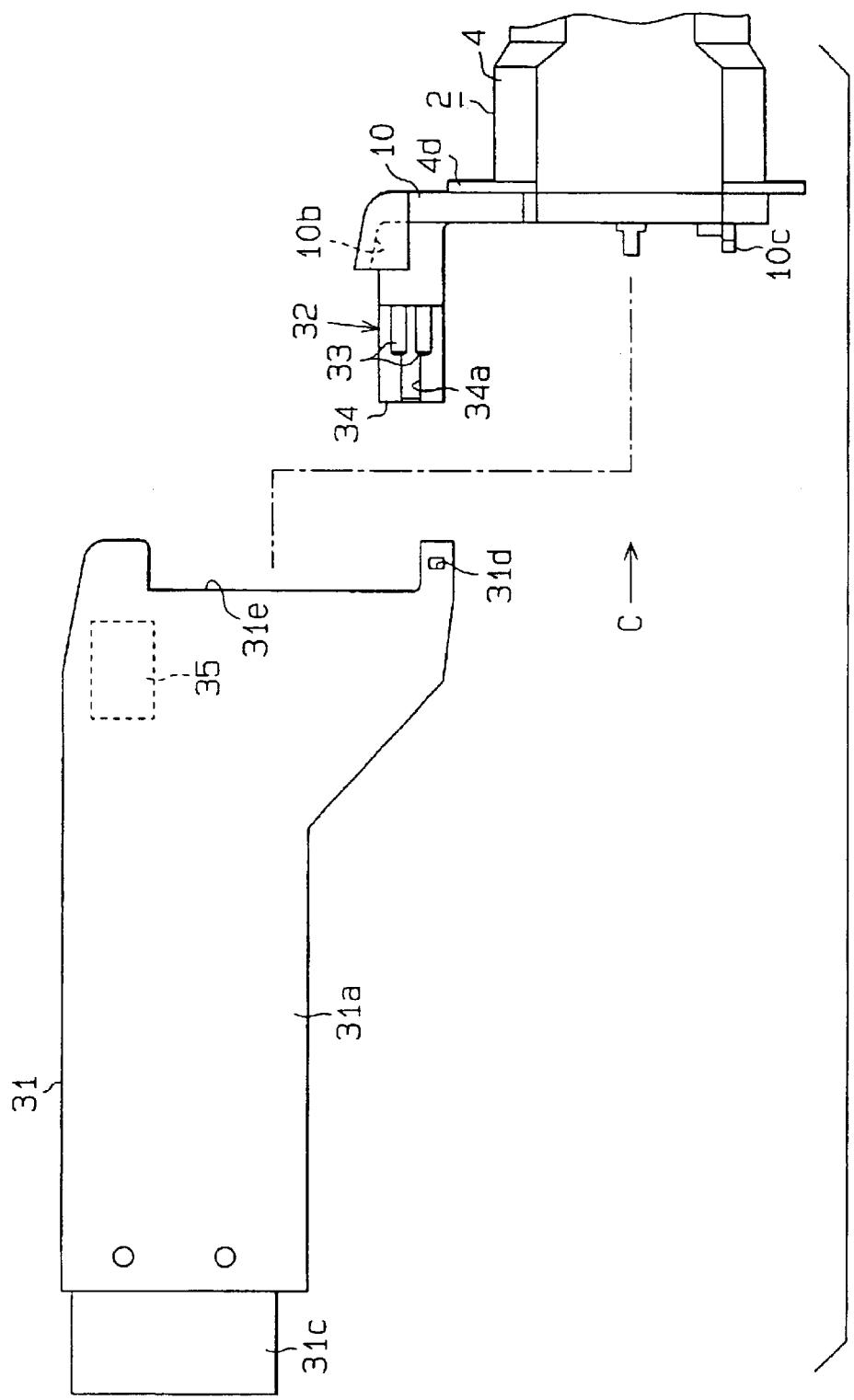
FIG. 7 is a partial schematic view of an electronic control unit and the motor unit according to the second embodiment, showing a disconnected state of the electronic control unit and the motor unit.
Figure 8:
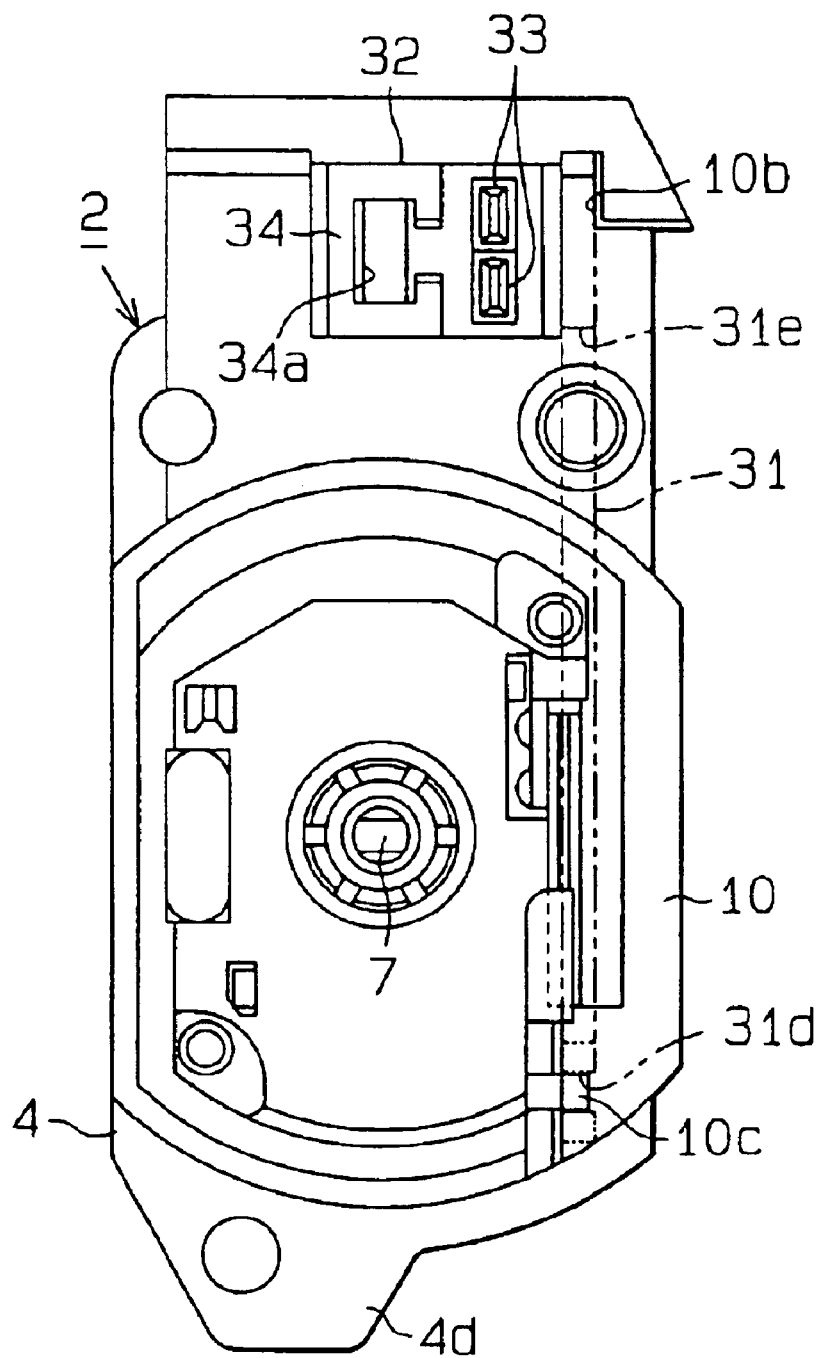
FIG. 8 is a schematic end view of the motor unit of the motor according to the second embodiment in a direction of arrow C in FIG. 7.

With reference to FIG. 4, two screw receiving holes 10a penetrate through the brush holder 10 in the direction of the axis L1. The screw receiving holes 10a of the brush holder 10 are aligned with the threaded holes 15a, respectively, of the support plate 15 when the brush holder 10 is fitted to the open end 21a of the gear housing 21. Two through holes 4e penetrate through the yoke flange 4d of the yoke housing 4 in the direction of the axis L1 of the motor 1. The through holes 4e of the yoke flange 4d are aligned with the screw receiving holes 10a, respectively, of the brush holder 10 when the yoke housing 4 is connected to the gear housing 21. Thus, threaded holes 15a of the support plate 15 are aligned with the corresponding screw receiving holes 10a and the corresponding through holes 4e.

Before the yoke housing 4 is secured to the gear housing 21 at the securing points (threaded holes 15a) on the support plate 15 with the screw 13, an electronic control unit (ECU) 31 is first inserted in an ECU receiving portion 21e of the gear housing 21 through the open end 21a of the gear housing 21. Then, the support plate 15 is inserted into the plate receiving holes 16 of the gear housing 21. At this time, the support plate 15 is press fitted into the plate receiving holes 16, so that the support plate 15 is securely retained in the plate receiving holes 16. That is, the support plate 15 is temporarily secured in the plate receiving holes 16 and is thus positioned relative to the gear housing 21. Then, the brush holder 10, which is previously fitted into the open end 4c of the yoke housing 4, is fitted into the open end 21a of the gear housing 21 along with the yoke housing 4. At this state, the one screw 13 is inserted through the through hole of the yoke housing 4 and the through hole of the gear housing 21 and is threadably engaged with the nut 14 (FIG. 1). Thus, the yoke housing 4 is secured to the gear housing 21, and the brush holder 10 is clamped between the support plate 15 and the yoke flange 4d. Thereafter, as shown in FIG. 4, the two screws 13 are inserted through the through holes 4e of the yoke flange 4d and the screw receiving holes 10a of the brush holder 10 and are threadably engaged with the threaded holes 15a of the support plate 15. As a result, the yoke housing 4 is secured to the gear housing 21 to close the open end 21a of the gear housing 21, as shown in FIG. 3.

The speed reducing unit 3 includes the above-described gear housing 21 made of a resin material. The gear housing 21 includes a rotatable shaft receiving portion 21b and a worm shaft receiving portion 21c. The worm shaft receiving portion 21c is communicated with the rotatable shaft receiving portion 21b and extends along the direction of the axis L1 of the motor 1. The gear housing 21 further includes a worm wheel receiving portion 21d. The worm wheel receiving portion 21d extends in a direction, which is perpendicular to the axial direction L1 of the motor 1 and is parallel to the planar direction (flat direction) of the flat wall 4a. The gear housing 21 also includes the above-described ECU receiving portion 21e. The ECU receiving portion 21e is communicated with the rotatable shaft receiving portion 21b and is positioned on one side (right side in FIG. 1) of the worm shaft receiving portion 21c, which extends along the axis L1, opposite the worm wheel receiving portion 21d. The rotatable shaft receiving portion 21b and the ECU receiving portion 21e have the common open end 21a, which faces the motor unit 2.

In the rotatable shaft receiving portion 21b, a driving-side rotator 22a of a cushioning coupler 22 is connected to the distal end of the rotatable shaft 7 to rotate integrally therewith. The driving-side rotator 22a is secured to the distal end of the rotatable shaft 7 after the magnets 5 and the armature 6 are installed in the yoke housing 4, and the brush holder 10 is fitted to the open end 4c of the yoke housing 4.

The cushioning coupler 22 includes the above-described driving-side rotator 22a, a driven-side rotator 22b and a cushion member 22c. The driven-side rotator 22b is connected to a worm shaft 24 to rotate integrally therewith. The cushion member 22c is positioned between the driving-side rotator 22a and the driven-side rotator 22b. The cushioning coupler 22 is assembled to couple the rotatable shaft 7 to the worm shaft 24 when the motor unit 2 and the speed reducing unit 3 are assembled together.

In the cushioning coupler 22, when the motor unit 2 is rotated to rotate the rotatable shaft 7, the driving-side rotator 22a is rotated integrally with the rotatable shaft 7. Rotational force of the driving-side rotator 22a is conducted to the driven-side rotator 22b through the cushion member 22c. Thus, the driven-side rotator 22b and the worm shaft 24 are integrally rotated together by the driving-side rotator 22a. At this time, the cushion member 22c of the cushioning coupler 22 cushions shocks generated between the rotatable shaft 7 and the worm shaft 24.

In the worm shaft receiving portion 21c, the worm shaft 24, which has a worm 24a integrally formed in the worm shaft 24, is rotatably supported by a couple of bearings 25 arranged in the worm shaft receiving portion 21c. The driven-side rotator 22b of the cushioning coupler 22 is arranged at the base end of the worm shaft 24. A sensor magnet 23, which acts as a rotation detection member, is secured to the base end of the worm shaft 24 before the driven-side rotator 22b is secured to the worm shaft 24.

A worm wheel 26 is rotatably received in the worm wheel receiving portion 21d and is meshed with the worm 24a. The worm wheel 26 is rotatably supported by a support shaft 27, and a gear 26a is arranged at the center of the worm wheel 26. The gear 26a is connected to a sunroof drive system (not shown). Rotational force of the worm shaft 24 is transmitted to the worm wheel 26 to rotate the gear 26a, so that a sunroof is moved through the sunroof drive system.

The ECU 31 (FIGS. 2 and 4) is received in the ECU receiving portion 21e. The ECU 31 includes a control circuit board 31a, which controls the rotation of the motor 1. With reference to FIG. 2, guide grooves 21f are formed in the ECU receiving portion 21e in the direction of the axis L1 of the motor 1. The guide grooves 21f guide lateral edges of the control circuit board 31a. Thus, the control circuit board 31a is inserted into the ECU receiving portion 21e along the guide grooves 21f, so that a component mounting surface 31b of the circuit board 31a, on which a control circuit (not shown) is arranged, extends parallel to the planar direction (flat direction) of the flat wall 4a of the yoke housing 4.

With reference to FIG. 4, a power supply connector 31c is secured to the control circuit board 31a, for example, with screws. The power supply connector 31c supports a plurality of terminals (not shown), which are electrically connected to the control circuit.

Here, the gear housing 21 includes a connector portion 21g, which is connected to a vehicle-side connector (not shown) extending from a vehicle side. A communication hole 21h extends through the connector portion 21g to communicate the ECU receiving portion 21e and the outside of the gear housing 21. The power supply connector 31C is received in the communication hole 21h, and each terminal is disposed in the communication hole 21h. When the connector portion 21g is connected with the vehicle side connector, electric power and control signals can be supplied to the control circuit of the circuit board 31a from the vehicle-side connector through the terminals.

The above embodiment provides the following advantages.

(1) The support plate 15, which extends across the open end 21a of the gear housing 21, is installed in the gear housing 21 after the ECU 31 is installed in the ECU receiving portion 21e. Thus, the ECU 31 can be easily installed into the gear housing 21 through the open end 21a of the gear housing 21 while the open end 21a of the gear housing 21 is not obstructed. Furthermore, this permits freedom in arrangement of elements on the control circuit of the ECU 31.

(2) The support plate 15 is formed such that when the support plate 15 is received in the plate receiving holes 16 of the gear housing 21, each end surface of the support plate 15 is substantially flushed with the outer surface of the corresponding lateral wall of the gear housing 21. Furthermore, the threaded holes 15a of the support plate 15 are positioned such that when the support plate 15 is inserted into the plate receiving holes 16, the threaded holes 15a are located inward of the inner wall surfaces of the gear housing 21. Thus, no protrusion having a bearing surface, which supports and threadably engages with the corresponding screw 13, is arranged on the outer surface of the gear housing 21, so that a size of the motor 1 is minimized. Thus, an installation position of the motor 1 relative to the sunroof system is less likely to be limited by the size of the motor 1.

(3) Positions of the plate receiving holes 16 are determined in consideration of the axial thickness of the brush holder 10, so that the plate receiving holes 16 are positioned to allow close contact of the support plate 15 with the brush holder 10. Thus, the brush holder 10 can be clamped between the support plate 15 and the yoke flange 4d, and the screws 13 can be tightly threaded into the threaded holes 15a of the support plate 15 to maintain the secure connection between the yoke housing 4 and the gear housing 21.

(4) The size of each plate receiving hole 16 is slightly smaller than the size of the corresponding end surface of the support plate 15. This permits press fitting of the support plate 15 into the plate receiving holes 16, and thereby the support plate 15 is securely retained by the plate receiving holes 16. That is, the support plate 15 is temporarily secured in the plate receiving holes 16, and the support plate 15 is positioned relative to the gear housing 21. Thus, when the motor unit 2 is secured to the gear housing 21, the tightening operation of the screws 13 can be relatively easily carried out.

(5) The single support plate 15 is used to threadably secure the two screws 13 thereto. Thus, it is not necessary to provide an individual support plate to each screw 13. This permits a reduction in the number of the components. Thus, the motor unit 2 can be more easily connected to the gear housing 21.

(6) The screws 13 are threadably secured to the support plate 15 while the brush holder 10 is clamped between the support plate 15 and the yoke flange 4d (yoke housing 4). Thus, the open end 21a of the gear housing 21 can be effectively closed to restrain fluid penetration of fluid, such as water, and dusts into an interior of the gear housing 21.

(7) The brush holder 10 closes the open end 21a, which is common to the rotatable shaft receiving portion 21b and the ECU receiving portion 21e. Thus, brush holder 10 is shared by both the rotatable shaft receiving portion 21b and the ECU receiving portion 21e to cover their openings, and this permits a reduction in the number of the components.

(8) After the ECU 31 is received in the ECU receiving portion 21e, the motor unit 2 is connected to the gear housing 21. Thus, positioning of the ECU 31 can be effectively easily carried out.

Second Embodiment

A second embodiment of the present invention will be described with reference to the accompanying drawings. In the first embodiment, the ECU 31 is first inserted in the ECU receiving portion 21e of the gear housing 21, and then the support plate 15 is installed to the gear housing 21. Thereafter, the motor unit 2 is secured to the speed reducing unit 3. The second embodiment differs from the first embodiment as follows. That is, in the second embodiment, the ECU 31 is first installed to the brush holder 10 (motor unit 2 side) and is then installed in the ECU receiving portion 21e of the gear housing 21. Thereafter, the motor unit 2 is secured to the speed reducing unit 3 with the screws 13. Thus, the following description of the second embodiment will be mainly focused on the differences between the first embodiment and the second embodiment, and the components similar to those discussed in the first embodiment will be indicated by the same numerals and will not be described further.

Figure 9:
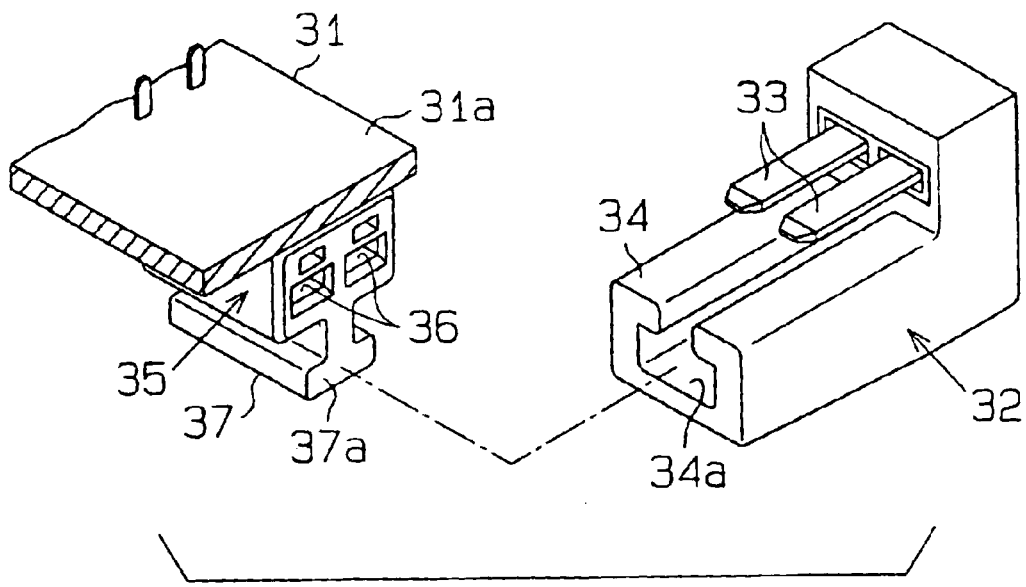
FIG. 9 is a partial perspective view showing a connector of the electronic control unit and a connector of the motor unit according to the second embodiment.
Figure 10:
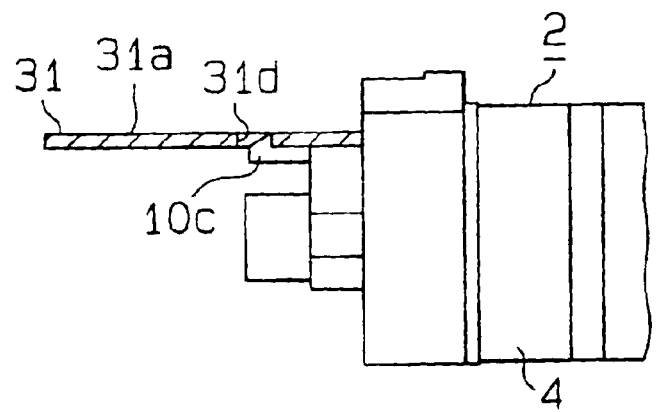
FIG. 10 is a partial cross sectional view of the motor of the second embodiment taken along line X—X in FIG. 6.

With reference to FIGS. 5 to 8, a brush holder 10 of a motor 1a has a retainer slit 10b. The retainer slit 10b receives and retains a portion of one lateral side of an ECU 31 (control circuit board 31a) located near a motor unit 2 side end of the ECU 31. The brush holder 10 also includes a motor unit side connector 32. The motor unit side connector 32 of the brush holder 10 is integrally formed in the brush holder 10 near the slit 10b and is physically and electrically connected to the ECU 31. With reference to FIG. 9, the connector 32 includes a pair of terminals 33 and a connecting portion 34. The terminals 33 extend in a direction of an axis L1 of the motor 1a and are electrically connected to a pair of brushes 11. The connecting portion 34 has a connecting groove 34a, which has a T-shaped cross section and extends in the direction of the axis L1 of the motor 1a. The brush holder 10 also includes an engaging claw 10c located at the other lateral side of the control circuit board 31a. The engaging claw 10c extends in the direction of the axis The ECU 31 (control circuit board 31a) has an ECU side connector 35 at the one lateral side of the ECU 31 (control circuit board 31a) near the motor unit 2 side end of the ECU 31. The ECU-side connector 35 is physically and electrically connected to the motor unit side connector 32. With reference to FIG. 9, the ECU side connector 35 includes a pair of receiving holes 36 and a connecting portion 37. The receiving holes 36 of the ECU side connector 35 receives the terminals 33, respectively, of the motor unit side connector 32. The connecting portion 37 of the ECU side connector 35 is connected with the connecting portion 34 of the motor unit side connector 32. Furthermore, the connecting portion 37 of the ECU side connector 35 includes a connecting ridge 37, which has a T-shaped cross section and is received in the connecting groove 34a of the motor unit side connector 32. With reference to FIG. 10, the control circuit board 31a also includes an engaging hole 31d at the other lateral side of the control circuit board 31a near the motor unit 2 side end of the control circuit board 31a. The engaging hole 31d of the control circuit board 31a is engaged with the engaging claw 10c of the brush holder 10 to restrain movement of the control circuit board 31a in the direction of the axis L1. The control circuit board 31a also includes a notch (defining a window, through which the support plate 15 extends) 31e on the motor unit 2 side end of the control circuit board 31a between the engaging hole 31d and the ECU side connector 35. The notch 31e is provided to restrain physical interference or physical contact of the control circuit board 31a, for example, with components (e.g., thermistor and the like) mounted to the brush holder 10 and a support plate 15. The notch 31e can be replaced with a corresponding through hole (window) for restraining the physical interference of the control circuit board 31a with the support plate 15, if appropriate.

In the process of connecting the motor unit 2 to the speed reducing unit 3, the brush holder 10 is first installed to the motor unit 2 (yoke housing 4), and then the ECU 31 (control circuit board 31a) is installed to the brush holder 10. That is, the one lateral side of the control circuit board 31a is inserted into the retainer slit 10b of the brush holder 10, so that the connector 35 of the control circuit board 31a is connected with the connector 32 of the brush holder 10. That is, the connecting ridge 37a of the control circuit board 31a is inserted into the connecting groove 34a of the brush holder 10, and the receiving holes 36 of the control circuit board 31a receive the terminals 33 of brush holder 10.

Furthermore, the engaging hole 31d of the control circuit board 31a is engaged with the engaging claw 10c of the brush holder 10. Thus, the ECU 31 is securely held by the brush holder 10 (motor unit 2).

Then, the ECU 31 held by the brush holder 10 (motor unit 2) is inserted into the ECU receiving portion 21e of the gear housing 21, and thus the yoke housing 4 abuts against the gear housing 21. Next, the support plate 15 is press fitted into receiving holes 16 of the gear housing 21. At this stage, the support plate 15 extends through a space of the notch 31e, so that the support plate 15 does not interfere with the control circuit board 31a. Then, one screw 13 is inserted through a through hole of the yoke housing 4 and a through hole of the gear housing 21 and is threadably securely engaged with a nut 14. Furthermore, two screws 13 extend through the yoke housing 4 and the brush holder 10 and are threadably engaged with threaded holes 15a of the support plate 15 in the gear housing 21. As a result, the yoke housing 4 and the gear housing 21 (i.e., the motor unit 2 and the speed reducing unit 3) are secured together.

The second embodiment of the present invention provides the following advantages.

(1) In the second embodiment, advantages similar to those discussed in the sections (1) to (7) of the first embodiment can be achieved.

(2) In the second embodiment, before the motor unit 2 is connected to the gear housing 21, the ECU 31 is held by and is electrically connected to the motor unit 2 (brush holder 10). Thus, a state of the electrical connection between the ECU 31 and the motor unit 2 can be checked before they are installed to the gear housing 21.

(3) The connectors 32, 35 include the connecting portions 34, 37. Thus, when the connecting portions 34, 37 are connected together, the connecting portions 34, 37 can add reinforcing support to the terminals 33 and thus can restrain application of excessive load to the terminals 33.

(4) The ECU 31 (control circuit board 31a) is inserted in the retainer slit 10b of the brush holder 10, and the connectors 32, 35 are connected together. Furthermore, the engaging claw 10c is engaged with the engaging hole 31. Thus, the ECU 31 is securely held by the brush 10, so that the motor unit 2 having the ECU 31 can be easily connected to the gear housing 21.

The above embodiments can be modified as follows.

In the above embodiments, the motors 1, 1a are used as the drive source for driving the vehicle sunroof system. However, the motors 1, Bdda can be used as a drive source of any other system or device, such as a power window system of a vehicle.

In the above embodiments, the support plate 15 is made of the metal material. Alternatively, the support plate 15 can be made of any other appropriate material.

In the above embodiments, the open end 21a of the gear housing 21 is closed with the brush holder 10. Alternatively, the open end 21a of the gear housing 21 can be closed with any other component, which is made, for example, of a resin material and is clamped between the yoke flange 4d and the support plate 15.

In the above embodiments, a seal member, which is made, for example, of an elastomer resin material, can be integrally formed with the brush holder 10 through a double injection molding process to further restrain penetration of water through the open end 4c of the yoke housing 4 and the open end 21a of the gear housing 21.

In the above embodiments, the yoke flange 4d and the support plate 15 are secured together with the screws 13 at the position where the brush holder 10 is interposed. This arrangement can be modified. For example, the brush holder 10 and the support plate 15 can be further secured together with an additional screw(s) at a point where the brush holder 10 is exposed from the yoke flange 4d (FIG. 3).

The shape of the gear housing 21 in each above embodiment is not limited to the one shown in the drawings. For example, in the above embodiments, the rotatable shaft receiving portion 21b and the ECU receiving portion 21e have the common open end 21a. Alternatively, each of the rotatable shaft receiving portion 21b and the ECU receiving portion 21e can have its own separate open end.

The cushioning coupler 22 of the above embodiments can be changed to a one way clutch.

Additional advantages and modifications will readily occur to those skilled in the art. The invention in its broader terms is therefore, not limited to the specific details, representative apparatus, and illustrative examples shown and described.

What is claimed is:

1. A motor comprising:
 a motor unit, which includes and rotates a rotatable shaft; and
 a speed reducing unit, which is connected to the motor unit and reduces a rotational speed of the rotatable shaft, wherein:
  the speed reducing unit includes a gear housing and a support plate;
  the gear housing has an open end and receives an electronic control unit that controls rotation of the rotatable shaft;
  the support plate is detachably supported in the gear housing in such a manner that the support plate extends across the open end of the gear housing in a direction perpendicular to an axial direction of the motor; and
  the motor unit is secured to the support plate with at least one fastening member to securely connect the motor unit to the gear housing.

2. A motor according to claim 1, wherein the gear housing has a couple of plate receiving holes, which penetrate through opposite walls, respectively, of the gear housing in the direction perpendicular to the axial direction of the motor at the open end of the gear housing and supports the support plate.

3. A motor according to claim 2, wherein the plate receiving holes are positioned such that the support plate supported in the plate receiving holes is spaced away from the electronic control unit.

4. A motor according to claim 2, wherein the electronic control unit includes a control circuit board, and the control circuit board defines a window, through which the support plate extends.

5. A motor according to claim 4, wherein the control circuit board of the electronic control unit includes a notch that defines the window, through which the support plate extends.

6. A motor according to claim 2, wherein the support plate is inserted in the plate receiving holes such that opposite end surfaces of the support plate are substantially flushed with outer surfaces, respectively, of the opposite walls of the gear housing.

7. A motor according to claim 1, wherein the motor unit has a yoke housing, which includes:
 an open end, which is connected to the open end of the gear housing;
 a flange, which extends from the open end of the yoke housing in the direction perpendicular to the axial direction of the motor; and a brush holder received in the open end of the yoke housing, wherein the brush holder is clamped between the flange of the yoke housing and the support plate, and the at least one fastening member secures the flange of the yoke housing, the brush holder and the support plate together.

8. A motor according to claim 1, wherein the motor unit includes a connector, and the electronic control unit includes a connect or physically and electrically connected to the connector of the motor unit.

9. A motor according to claim 1, wherein the motor unit is secured to the support plate with the at least one fastening member at at least one point of the support plate, wherein the at least one point of the support plate is located radially inward of inner wall surfaces of the gear housing.

10. A motor according to claim 1, wherein the at least one fastening member includes a plurality of fastening members, which are fastened to the support plate.

11. A motor according to claim 7, wherein the gear housing includes:
    a rotatable shaft receiving portion for receiving the rotatable shaft; and
    an electronic control unit receiving portion for receiving the electronic control unit, wherein the open end of the gear housing is communicated with both the rotatable shaft receiving portion and the electronic control unit receiving portion, and the brush holder closes the open end of the gear housing.

12. A motor according to claim 7, wherein:
    the at least on e fastening member includes at least one screw;
    the flange of the yoke housing includes at least one through hole for receiving the at least one screw, wherein the at least one through hole extends through the flange in the axial direction of the motor;
    the brush holder includes at least one screw receiving hole for receiving the at least one screw, wherein the at least one screw receiving hole extends through the brush holder in the axial direction of the motor;
    the support plate includes at least one threaded hole for threadably engaging with the at least one screw, wherein the at least one threaded hole extends through the support plate in the axial direction of the motor; and
    the at least one screw is inserted through the at least one through hole of the flange of the yoke housing and the at least one screw receiving hole of the brush holder and is threadably securely engaged with the at least one threaded hole of the support plate.

13. A method for manufacturing a motor including a motor unit and a speed reducing unit connected to the motor unit, wherein the motor unit includes and rotates a rotatable shaft, and the speed reducing unit reduces a rotational speed of the rotatable shaft and includes a gear housing, which has an open end and receives an electronic control unit that controls rotation of the rotatable shaft, the method comprising steps of:
    inserting the electronic control unit within the gear housing;
    inserting a support plate into a couple of plate receiving holes, which penetrate through opposite walls, respectively, of the gear housing in a direction perpendicular to an axial direction of the motor at the open end of the gear housing, so that the support plate extends across the open end of the gear housing in the direction perpendicular to the axial direction of the motor; and
    securing the motor unit to the support plate with at least one fastening member to securely connect the motor unit to the gear housing.

14. A method for manufacturing a motor including a motor unit and a speed reducing unit connected to the motor unit, wherein the motor unit includes and rotates a rotatable shaft, and the speed reducing unit reduces a rotational speed of the rotatable shaft and includes a gear housing, which has an open end and receives an electronic control unit that controls rotation of the rotatable shaft, the method comprising steps of:
    physically and electrically connecting the electronic control unit to the motor unit;
    inserting the electronic control unit within the gear housing, so that the motor unit abuts against the gear housing;
    inserting a support plate into a couple of plate receiving holes, which through opposite walls, respectively, of the gear housing in a direction perpendicular to an axial direction of the motor at the open end of the gear housing, so that the support plate extends across the open end of the gear housing in the direction perpendicular to the axial direction of the motor; and
    securing the motor unit to the support plate with at least one fastening member to securely connect the motor unit to the gear housing.

* * * * *